United States Patent
Gondi et al.

(10) Patent No.: US 6,671,704 B1
(45) Date of Patent: *Dec. 30, 2003

(54) METHOD AND APPARATUS FOR HANDLING FAILURES OF RESOURCE MANAGERS IN A CLUSTERED ENVIRONMENT

(75) Inventors: Albert C. Gondi, Santa Clara, CA (US); Johannes Klein, San Francisco, CA (US); John S. de Roo, Cupertino, CA (US); Sitaram V. Lanka, Mercer Island, WA (US); Ramprasad K. L. Sripada, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/267,032

(22) Filed: Mar. 11, 1999

(51) Int. Cl.⁷ .......................... G06F 12/00; G06F 11/00
(52) U.S. Cl. ............................ 707/204; 707/202; 714/4
(58) Field of Search .................. 707/1–10, 200, 707/511, 201–204; 709/101, 248, 227, 201, 237; 714/20, 16, 2, 10–13, 4

(56) References Cited

U.S. PATENT DOCUMENTS

| | | | |
|---|---|---|---|
| 4,228,496 A | 10/1980 | Katzman et al. ............ 364/200 |
| 4,817,091 A | 3/1989 | Katzman et al. ............... 371/9 |
| 5,319,774 A * | 6/1994 | Ainsworth et al. ........... 714/20 |
| 5,327,532 A * | 7/1994 | Ainsworth et al. ......... 709/248 |
| 5,504,899 A * | 4/1996 | Raz ............................. 707/10 |
| 5,504,900 A | 4/1996 | Raz ............................ 395/650 |
| 5,680,610 A | 10/1997 | Smith et al. ................ 395/610 |
| 5,701,480 A * | 12/1997 | Raz ............................ 709/101 |
| 5,751,932 A | 5/1998 | Horst et al. ............... 395/182.1 |
| 5,835,766 A | 11/1998 | Iba et al. .................... 395/679 |
| 5,920,863 A | 7/1999 | McKeehan et al. ........... 707/10 |
| 5,923,833 A | 7/1999 | Freaund et al. ........ 395/182.17 |
| 5,926,463 A | 7/1999 | Ahearn et al. .............. 370/254 |
| 6,101,527 A | 8/2000 | Lejeune et al. ............ 709/201 |
| 6,105,147 A * | 8/2000 | Molloy ........................ 714/16 |
| 6,115,711 A | 9/2000 | White ........................ 707/10 |
| 6,173,313 B1 | 1/2001 | Klots et al. ................. 709/203 |
| 6,205,464 B1 | 3/2001 | Cobb et al. ................. 709/101 |
| 6,209,038 B1 | 3/2001 | Bowen et al. .............. 709/238 |
| 6,266,698 B1 * | 7/2001 | Klein et al. ................. 709/227 |
| 6,286,110 B1 * | 9/2001 | Klein et al. .................... 714/2 |
| 6,295,548 B1 * | 9/2001 | Klein et al. ................. 709/101 |
| 6,338,146 B1 * | 1/2002 | Johnson et al. ................ 714/4 |
| 6,411,981 B1 * | 6/2002 | Klein et al. ................. 709/101 |

OTHER PUBLICATIONS

Jim Gray, et al.; Transaction Processing: Concepts and Technique; Morgan Kauffman; 1993; pp. v–xxxii.

* cited by examiner

Primary Examiner—Uyen Le
Assistant Examiner—Te Yu Chen

(57) ABSTRACT

A transaction processing system manages an information collection by employing a two-phase transaction commit protocol. Transaction participants are provided a unique identifier for use in communicating with the transaction management facility in a distributed environment. If the participant is lost, a backup participant is created, and provided with the same identifier as the failed participant to carry on with the transaction in place of the failed participant.

12 Claims, 2 Drawing Sheets

METHOD AND APPARATUS FOR HANDLING FAILURES OF RESOURCE MANAGERS IN A CLUSTERED ENVIRONMENT

CROSS-REFERENCE TO RELATED APPLICATIONS

This application is related to:

U.S. Patent Application entitled "PROCESS OF MAINTAINING A DISTRIBUTED MAP OF TRANSACTION IDENTIFIERS AND USING HASHING TO ACCESS THESE MAPS", Ser. No. 09/267,422, filed on Mar. 12, 1999, U.S. Patent Application entitled "SYSTEM AND METHODS FOR THE DETECTION OF A LOOP-BACK OF A TRANSACTION", Ser. No. 09/267,460, filed on Mar. 12, 1999, and U.S. Patent Application entitled "DETECTION OF AN IMPORTED TRANSACTION FOR FINDING THE GLOBAL TRANSACTION IDENTIFIER", Ser. No. 09/267,844, filed on Mar. 12, 1999.

BACKGROUND OF THE INVENTION

The invention relates generally to a clustered processing system formed from multiple processor units with fault-tolerant capability. More particularly, the invention relates to a method, and apparatus for implementing that method, for handling, in a fault-tolerant manner, the failure of a resource manager in the context of a transaction executing on the system.

A useful definition of a transaction is that it is an explicitly delimited operation, or set of related operations, that change or otherwise modify the content of an information collection or database from one consistent state to another. Changes are treated as a single unit in that all changes of a transaction are formed and made permanent (i.e., the transaction is "committed") or none of the changes are made permanent (i.e., the transaction is "aborted"). If a failure occurs during the execution of a transaction, the transaction can be aborted and whatever partial changes were made to the collection can be undone to leave it in a consistent state.

Typically, transactions are performed under the supervision of a transaction manager facility (TMF). In geographically distributed systems, such as multiple processor unit systems or "clusters" (i.e., a group of independent processor units managed as a single system), the TMF is "distributed" in the sense that each processor unit will have its own TMF component to coordinate operations of a transaction conducted on that processor unit. The processor unit at which (or on which) a transaction begins is sometimes called the "beginner" processor unit, and the TMF component of that processor unit will operate to coordinate those transactional resources remote from its resident processor unit (i.e., resources managed by other processor units). Those TMF components running on processor units managing resources enlisted in a transaction are "participants" in the transaction. And, it is the TMF component of the beginner processor unit that initiates the steps taken.

A preferred approach to concluding the transaction, and confirming that all participant resources employed in a transaction are able to participate in that conclusion, is to use the Two-Phase Commit ("2PC") protocol. According to this approach the beginner TMF component, upon receipt of an "End Transaction" request from the application process that requested the transaction, will broadcast a "Prepare" signal to all processor units of the cluster. The processor units, upon receipt of the Prepare signal, will notify their (local) participant resources to perform as necessary (e.g., completing writes to disk storage, clearing memory, etc.) for effecting the change in state of the database and, if the necessary operation succeeds, respond with a "Ready" signal. If all participants of the transaction respond with an affirmative, i.e., a "Ready" signal (and "Not Involved" signals received from any processor units not participating in the transaction), the beginner TMF component will notify a transaction monitor process (TMP), running on one of the processor units, to "commit" the change to an audit log. The TMP will tell the beginner TMF component that the transaction is committed, and the beginner TMF component will then broadcast a "Commit" signal to the participant processor units. At this point the change is considered permanent.

Fault tolerance is another important feature of transaction processing. Being able to detect and tolerate faults allows the integrity of the collection being managed by the system to be protected. Although a number of different methods and facilities exist, one particularly effective fault tolerant technique is the "process-pair" technique as it is sometimes called. (This technique is also sometimes referred to as "fail-over" capability.) According to this technique, an application program is instantiated as two separate processes, a primary process resident on one processor unit of the cluster, and a backup process resident on another processor unit. If the primary process, or the processor unit upon which it is running, fails, that failure will bring into operation the backup process to take over the operation of the lost (primary) process. If that failure occurs during a transaction in which the lost process was a participant, the backup will decide whether or not to notify the beginner processor unit to abort the transaction and begin over again. In this way the state of the collection managed by the system remains consistent. An example of the process-pair or fail-over technique can be found in U.S. Pat. No. 4,817,091.

An alternative approach, one used for example by the software applications that use object linking and embedding (OLE), is to create a backup process only after the primary process is detected as having failed. The state needed by the newly-created backup is transferred after creation. One problem with this approach is that the state needed by the backup is often retained by the node or processor unit on which the primary was running. If it happens that the primary process has failed because the processor unit on which it was running failed, or it has lost the capability to communicate with the transaction manager, that state can be lost.

Also, there are times when the failure of a process, and the subsequent fail-over of the failed process to another processor unit (i.e., to the backup process), tend to impede transactions. For example, a stage in a transaction may be reached such that the participants no longer are able to abort the transaction. Should a participant process, or the processor unit, or some other facility related to the participant process, fail, the transaction will not be committed, and state used by the failed process will be left to clutter the system.

These problems normally do not occur in a coordinated system having component parts designed to work together. They most often appear when porting an application from one platform to another.

Accordingly, it can be seen that there exists a need for being able to provide full fail-over capability in a transaction processing system in order to maintain fault-tolerance. It follows, therefore, that the state created and maintained by the primary process should be placed where it can be reached for use by the backup process when necessary, regardless of how the primary process fails or is lost.

SUMMARY OF THE INVENTION

According to the present invention, in a transaction processing system using a transaction management facility (TMF) a certain state will be written to the audit log maintained by the TMF when a point (using a two-phase or 2PC commit operation) in a transaction is reached beyond which participation of the resources used in the transaction will be required. Typically, the point is when the Ready signal is received in response to the Prepare signal broadcast by the beginner TMF. According to the invention, the Ready signal is accompanied by state information from which the state needed by that participant can be recreated, and written to an audit log by the beginner TMF. If the participant fails, or is otherwise made unavailable, a backup participant will be created—preferably on another node—and provided with the same identifier of the now-failed participant. The backup participant will query TMF to determine if any transactions are outstanding and associated with the identifier. Responding, the TMF will supply the backup participant with the retained state information previously stored in the audit log, thereby allowing the backup participant to complete as necessary the transaction previously involving the failed participant.

A significant advantage of the invention is to allow OLE compliant applications, such as the Microsoft SQL Server (e.g., the Microsoft SQL Server 6.5) or the Microsoft Message Queue Server, to be ported to a foreign platform and yet keep their fault tolerant capability which relies upon detection of a failure of a process before a backup of that process is created.

These and other advantages and aspects of the invention will become apparent to those skilled in this art upon a reading of the following detailed description of the invention, which should be taken in conjunction with the accompanying drawings.

DESCRIPTION OF THE PREFERRED EMBODIMENT

The present invention is advantageous in that it permits OLE compliant applications and resources to be ported to a transaction processing system and to participate in transactions with a minimum of re-work of the application or process for the porting process. However, as those skilled in this art will see, the techniques used by the present invention can be readily employed in other systems (i.e., non-OLE systems). The present invention is designed to operate with a transaction processing facility that runs under the aegis of the NonStop operating system available from the assignee of the invention, the Compaq Computer Corporation, Cupertino, California. Thus, the invention allows OLE applications to conduct transactions under the NonStop operating system Transaction Manager Facility (TMF) and/ or use such OLE compliant resource manager processes as Microsoft SQL Server 6.5 (a high performance database management system for Windows NT-based systems) or the Microsoft Message Queue Server (a transactional support facility that allows message queues to participate in Microsoft Transaction Server transactions). These resource managers are constructed to operate in the context of another transaction manager. The present invention allows their use in the context of a foreign transaction manager and foreign operating system, yet still employ the fault tolerant techniques originally designed for them. (Microsoft, Microsoft Windows NT are registered trademarks of Microsoft Corporation of Redmond, Washington, and Microsoft SQL Server, and Microsoft Transactional Server are believed to be trademarks of Microsoft Corporation.)

Figure 1:
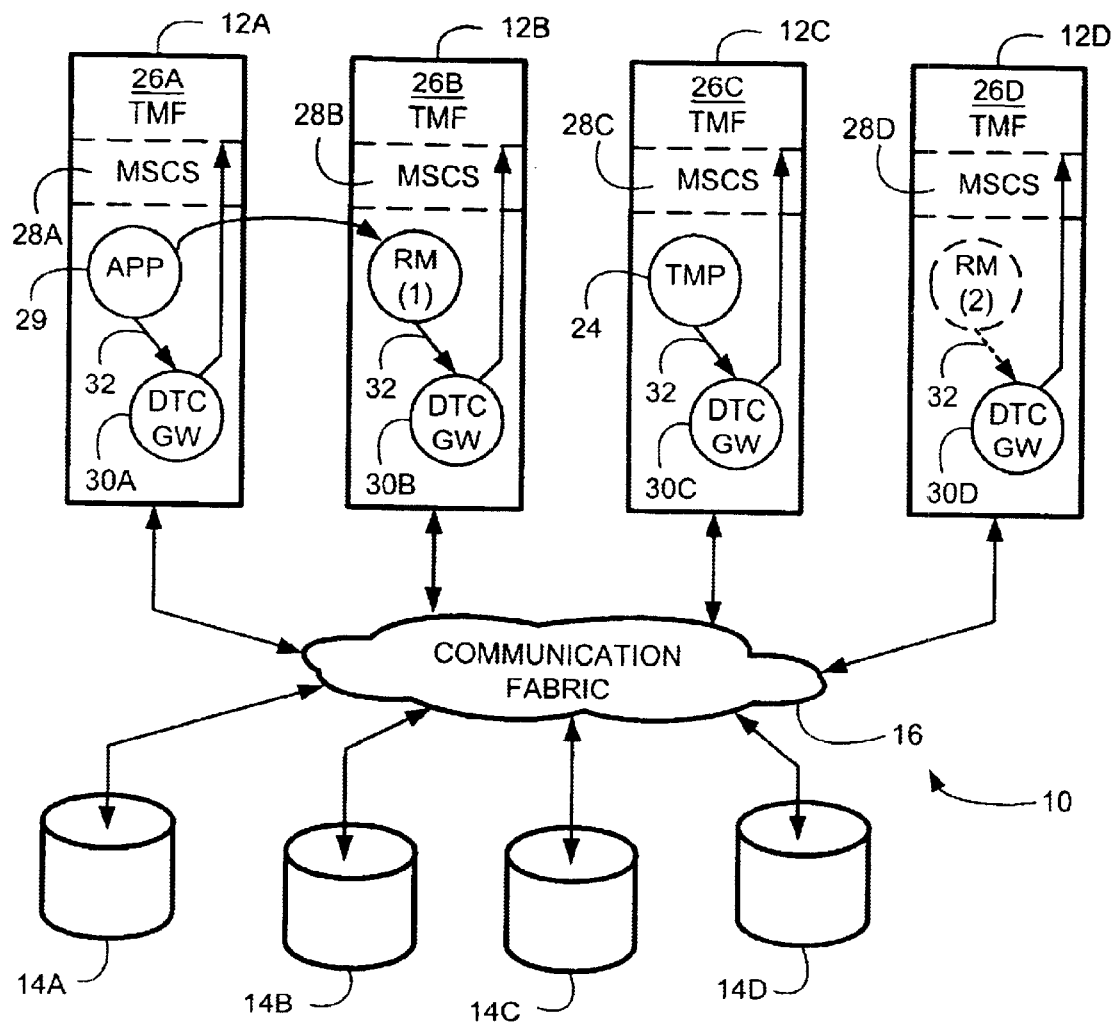
FIG. 1 is an illustrative diagram of a multiple processor cluster or system.

Turning now to the figures, and for the present FIG. 1, there is illustrated a multiple processor transaction processing system 10 capable of employing the present invention. As FIG. 1 shows, the transaction processing system 10 includes central processor units (CPUs) 12 (12a, 12b, . . . , 12d) and peripheral devices 14 (14a, 14b, . . . , 14d) interconnected by a communication fabric 14 that provides both interprocessor and input/output (I/O) communication. Preferably, the communication fabric 14 is constructed as is taught in U.S. Pat. No. 5,751,932. However, as will be evident to those skilled in this art, other multiprocessor architectures may be used, such as that taught in U.S. Pat. No. 4,228,496. As will also be evident to those skilled in this art, although only four CPUs are shown, the present invention may be used on any number of CPUs.

As conventional, the transaction processing system 10 will also include the necessary hardware, software, procedures, rules, and users needed to implement and operate a transaction processing application, including the NonStop or other operating system. In addition, there will be a distributed transaction manager facility (TMF), comprising a transaction manager process (TMP) 24 resident on one of the CPUs 12 (in FIG. 1, CPU 12c), and TMF components 26 allocated to each individual processors 12; that is, each of the processors 12 will have a TMF component 26 (26a, 26b, . . . , 26n) that operates to manage and track the local resource managers (RMs) running on that CPU (e.g., RM(1) on CPU 12b or RM(2) on CPU 12d). (The resource manager RM(2) is shown in phantom because, as will be seen in connection with the discussion below, it is created later as a backup to the resource manager RM(1).)

Preferably, the system 10 will included a fail-over capability, such as that provided by the NonStop operating system in the form of the "process pair" technique discussed above. However, for the OLE compliant processes there is provided a Microsoft Cluster Service (MSCS) 28. FIG. 1 also shows each CPU 12 having a component of MSCS 28. MSCS 28 operates to provide a fault tolerant capability by detecting failure of a process, or CPU 12 on which a process is running, and creating replacement or backup process on another CPU for taking over the function and operation of the failed process. As will be seen, the present invention provides the means to allow this "failover" to take place with a minimum of effort.

Since applications and resource managers, including those that are the OLE compliant, need a resource that provides an efficient communication link to TMF 26 there is provided a distributed transaction coordinator gateway (DTC-GW) 30. Although there needs to be only one DTC-GW 30 running on one of the CPUs 12, it is more efficient to have each CPU 12 to include at least one DTC-GW as FIG. 1 illustrates. Not only is the efficiency improved (by avoiding having processes use a DTC-GW on a CPU 12 different from its own), but as will be seen the failover capability provided by the MCSC 28 for fault tolerance is made more effective.

Finally, communication between the applications (e.g., APP 29) and resource managers (e.g., RM(1), RM(2)) and the DTC-GW 30 of the particular CPU 12 is via a driver 32 (32a, 32b, . . . , 32d). In addition, each DTC-GW 30 is communicatively coupled to the TMF component 26 of its particular CPU 12.

Figure 2:
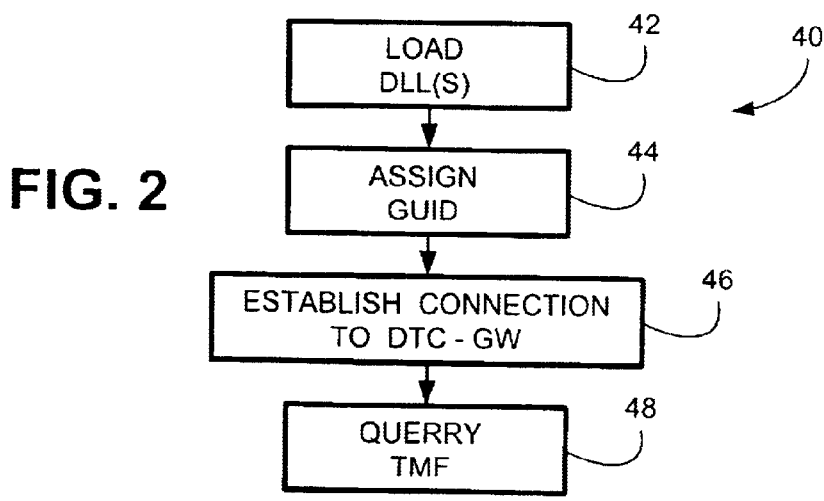
FIG. 2 is a flow diagram illustrating creation and migration of a resource manager process.

FIG. 2 shows a flow chart 40 that broadly illustrates the steps taken to create a process such as RM(1). Accordingly, when RM(1) is created, a dynamic-linked library (DLL) is loaded in step 42 to provide the RM(1) with various interfaces (e.g., procedure calls) required to communicate with the local transaction manager. Next, at step 44, the RM(1) is assigned a globally unique identifier (GUID). This GUID uniquely identifies the resource to the TMF 26, distinguishing it from all other processes (e.g., APP 29). Then, at step 46, a connection, including a driver 32, is provided the resource to the local DTC-GW 30. RM(1) will then, at step 48, query TMF 26 to determine if there is any transaction it should be aware of. Since the resource has been created as a primary resource, there will be no such transaction. If, on the other hand (as discussed further below) the RM(1) was created to replace a failed resource, and that failed resource was a participant in a transaction when it failed, TMF 26 could respond in the affirmative. This feature is discussed further below.

When a transaction is started in one CPU 12, that CPU 12 is known as the "beginner" CPU, and the TMF component 26 of that CPU becomes the "beginner" TMF component. If the transaction involves an operation performed on or at a CPU 12 other than the beginner CPU 12, that other CPU and its TMF component 26 become "participants" of the transaction and subordinate to the beginner TMF component on the beginner CPU. This may be better understood with an example.

Assume the APP 29 is requested to perform some operation or operations that will require the state of a database to be changed, and to perform that operation or operations the APP 29 must use the resource(s) managed by resource managers of the system 10 such as RM(1). The APP 29 will make a "Start Transaction" call to its local TMF component 26a to register the transaction. The TMF component 26a (now, the beginner TMF component) will, by this call (as is conventional), receive the information it needs to track the transaction so that it can ensure that the transaction completes properly. To enlist the services of the resource manager RM(1), the application 30 will send a request for it to modify the database maintained by the system 10. When RM(1) receives this request, it first contact its local DTC-GW for notifying its local TMF component 26b that it is a participant in the transaction started by the APP 29. The DTC-GW will first open a logical connection between it and the TMF 26 for this transaction, and communicate the notification from the RM(1). All colloquys with the TMF components by the APP 29 and the RM(1) is through the local DTC-GW 30 (i.e., DTC-GW 30a and 30b).

Figure 3:
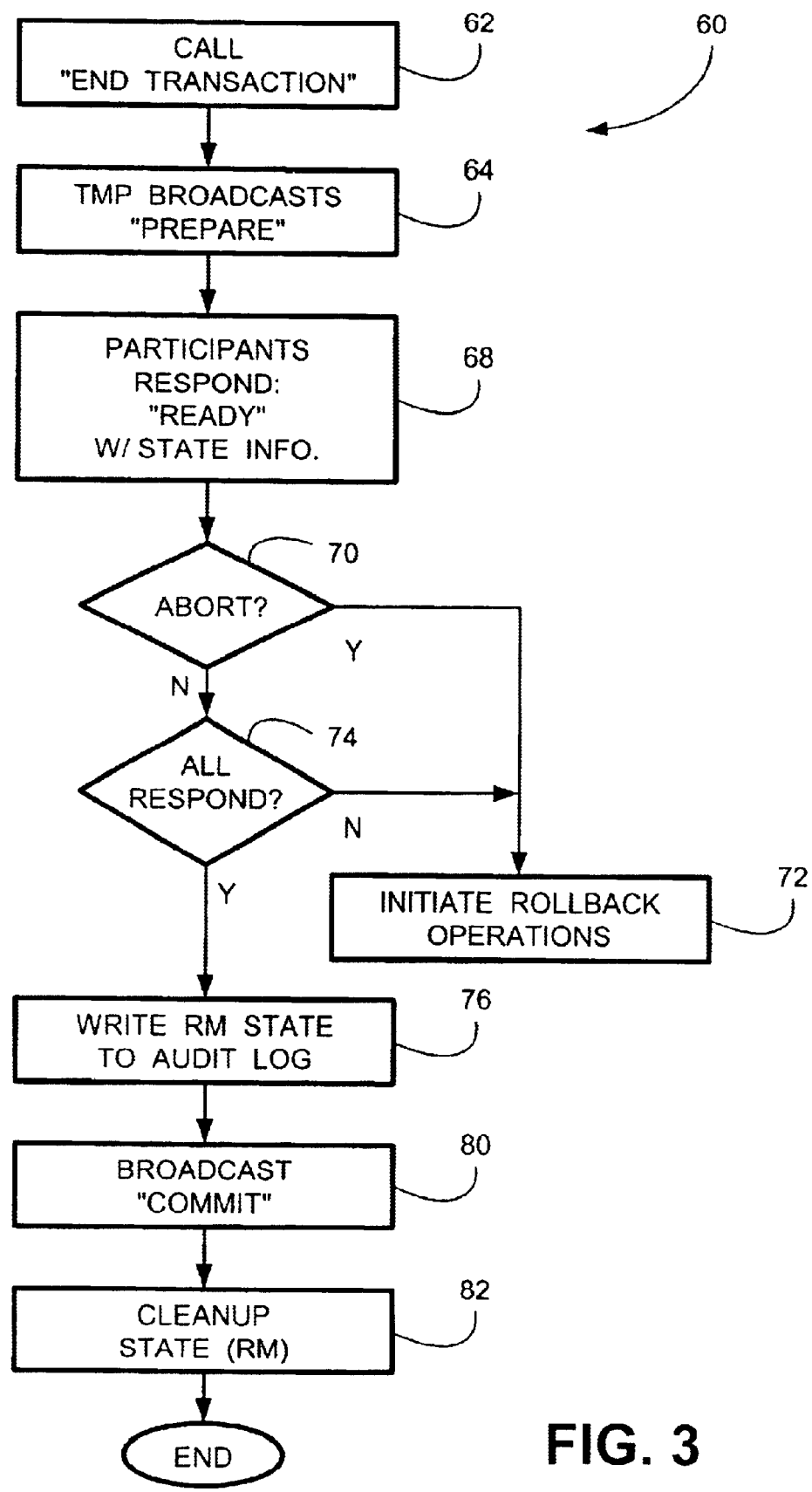
FIG. 3 is flow diagram broadly illustrating the steps a conventional two-phase commit protocol modified according to an implementation of the present invention.

FIG. 3 broadly illustrates, by the flow diagram 60, the major steps taken to make permanent the change or modification. When the request for work has been sent by the APP 29, and APP 29 has nothing else to do, it will then, in step 62, make a "End Transaction" call to the beginner TMF component 26a. The beginner TMF component 26a will, in turn, perform the necessary operations to make the change or modification permanent and consistent. Preferably, the conventional two-phase commit (presumed abort) protocol is used in which, at step 64, the beginner TMF component 26a broadcasts a "Prepare" signal to all CPUs 12. Those CPUs 12 having participants in the transaction—here RM(1)—will perform as necessary (e.g., completing writes to disk storage) for effecting the change in state of the database and, if the necessary operation succeeds, at step 68, respond with a "Ready" signal. If any participant responds with an "Abort" signal (decision 70), or one or more participants fail to respond with the obligatory Ready signal (step 74), the procedure 60 will proceed to step 72 to initiate a rollback of the transaction.

If, on the other hand, there are no Abort signals, and all participants of the transaction respond with an affirmative, i.e., a "Ready" signal (and "Not Involved" signals received from any CPUs 12 not participating in the transaction) the beginner TMF component 26a pass from step 74 to step 80 (bypassing here, for the moment, step 76) will notify the TMP 24 to "commit" the change to an audit log. The TMP 24 will tell the beginner TMF component 26b that the transaction is committed, and the beginner TMF component 26b, at step 80, then broadcasts a "Commit" signal to the participant CPUs 12. At this point the change is considered permanent. Upon receipt of the Commit signal, the RM(1) will cleanup whatever state is left from the operation(s) it performed in connection with the transaction.

Suppose, however, that during the transaction the RM(1) fails, or the communicative connection to its associated DTC-GW 30b is lost. If this occurs before the Ready signal (step 68) is received from the RM(1), TMF will assume (correctly) that either the CPU 12b or the RM(1) has failed and abort the transaction. However, if the failure occurs after the Ready signal is received, TMF can commit the transaction without knowing that RM(1) is unable to at least cleanup its state and complete the necessary operations. Even if a replacement is created for RM(1) by the MSCS 28 in the form of the RM(2) on CPU 12d, RM(2) cannot complete what needs be done because the state is often located with the original CPU in the associated DTC-GW 30b. The reason is that the necessary state associated with the was not available to the replacement resource manager in prior systems because it is usually kept by the DTC-GW 30.

Thus, according to the present invention, the conventional 2PC procedure, as described above, is modified to include the step 76. Thus, when all participants respond with Ready signals, the TMF components will, at step 76, receive state information from the corresponding DTC-GW 30, piggybacked on the Ready signal. The TMF 26 will then write the state information to an audit log (not shown).

Now, assume that after the RM(1) sends the responsive ready signal, accompanied by state information respecting the transaction to which the Ready signal pertains, the communicative connection RM(1) enjoyed with the DTC-GW 30b fails, or RM(1) itself fails, or the CPU 12b fails, the MSCS will be apprised of either of these facts and will, in turn, notify TMF 26. Tmf 26, in turn, will assume that the associated logical connections for the RM(1) have been closed. This is necessary, as will be seen, to allow TMF 26 to respond to queries from resource managers identifying themselves with the same GUID as that used by the RM(1).

Next, the MSCS 28 will create a copy of RM(1), RM(2), on the CPU 12d (FIG. 1) as a backup, following the same steps illustrated in FIG. 2 and described above. When the RM(2) is up and running, it will (step 46; FIG. 2) establish a connection, through a driver 32, with the local DTC-GW, DTC-GW 30d in order to be able to communicate with TMF (i.e., the TMF 26d component for that CPU). Then, in step 48, the backup resource manager to RM(1), RM(2), will query the TMF 26d component, using the GUID formally identifying the RM(1), in effect asking if there are any outstanding transactions in which RM(1) was a participant. Here, there is, assuming RM(1) was lost after RM(1) sent its Ready signal, but before it received the Commit signal. Accordingly, TMF 26d will respond in the affirmative by accessing the audit log for the state information originally sent it with the Ready signal from the RM(1), recreate that state from the state information, and forward it to RM(2). RM(2) will see that it (through RM(1)) is a participant in a transaction corresponding to the state data it received, and query TMF 26d about that transaction. TMF 26d, will reply, telling RM(2) that it has committed the transaction. RM(2) will then take steps to commit the transaction.

What is claimed is:

1. A method of providing fault tolerant operation of a transaction processing system, the method comprising the steps of:

sending a prepare signal to a resource manager process to begin the process of committing a transaction, the resource manager process being a participant in the transaction and identified by a globally unique identifier;

receiving a ready signal from the resource manager in response to the prepare signal, the ready signal being accompanied by state information regarding the state of the resource manager process; and subsequent to the receipt of the ready signal,
storing the received state information;
receiving notice of a loss of the resource manager process;
broadcasting a commit signal in response to the ready signal;
creating a backup resource manager process for taking over the function and operation of the lost resource manager process, the lost resource manager process being unable to receive or respond to the commit signal;
assigning to the backup resource manager process the globally unique identifier of the lost resource manager process; and
causing the backup resource manager process to complete the process of committing the transaction by (i) sending the stored state information to the backup resource manager process, in response to a query by the backup resource manager process using the assigned identifier, the backup resource manager process determining, from the stored state information, that the lost resource manager was a participant in the transaction, and (ii) sending information regarding the state of the transaction to the backup resource manager process, in response to a query by the backup resource manager process, the backup resource manager process taking steps to commit the transaction based on the transaction state received from the query.

2. A method as recited in claim 1,
wherein the transaction processing system includes at least two central processing units (CPUs);
wherein the resource manager includes a local resource manager component operating in each CPU; and
wherein one of the local resource managers is a beginner resource manager component.

3. A method as recited in claim 2, further comprising the step of, prior to sending the prepare signal, creating the resource manager process by
providing the resource manager with various interfaces for communicating with the local resource manager component,
assigning the identifier to the resource manager in order to identify the resource manager to the local resource manager component, and
responding to a query from the resource manager with information indicating any transactions the resource manager should be aware of.

4. A method as recited in claim 2, further comprising the step of, prior to sending a prepare signal, registering by the local resource manager the resource manager as a participant in the transaction.

5. A method as recited in claim 2,
wherein each CPU has resident thereon a local distributed transaction coordinator gateway; and
wherein the resource manager communicates with the local resource manager component via the local distributed transaction coordinator gateway.

6. A method as recited in claim 2, wherein the step of storing the state information includes storing the state information in an audit log by the local resource manager component.

7. A method as recited in claim 2, wherein the step of creating the backup resource manager includes providing the created resource manager with various interfaces for communicating with the local resource manager component.

8. A method as recited in claim 2,
wherein each CPU has a cluster service program resident thereon; and
wherein the step of creating a backup resource manager is performed by one of the cluster service programs.

9. A fault tolerant transaction processing system comprising:

a communication fabric for providing interprocessor and input/output communication;

a plurality of peripheral devices connected to the communication fabric, for storing a database thereon;

a plurality of central processor units (CPUs), connected to the communication fabric to communicate with the plurality of peripheral devices, at least one of the CPUs having a resource manager process having a globally unique identifier, and configured to participate in a transaction, modify the database, and report information regarding its state in a ready signal, and each CPU having a cluster service component configured to detect the loss of a process, including a resource manager process, create a backup resource manager process for taking over the function and operation of the lost resource manager process, including the operation of committing a transaction, and assign to a backup resource manager process a globally unique identifier of a lost resource manager process, the plurality of CPUs hosting a transaction manager facility (TMF) that includes a TMF component allocated to each CPU and configured to
send a prepare signal to any participating resource manager to begin the process of committing the transaction,
receive a ready signal from each resource manager participating in the transaction, the ready signal being accompanied by state information regarding the state of the resource manager process, and store the received state information, receive notice of a loss of a resource manager process, broadcast a commit to all of the CPUs having participating resource managers, send the stored state information to backup resource manager process, in response to a query by the backup resource manager process using an assigned identifier, the backup resource manager process determining, from the stored state information, that the lost resource manager was a participant in the transaction, and send information regarding the state of the transaction to a backup resource manager process, in response to a query by the backup resource manager process, the backup resource manager process taking steps to commit the transaction based on the transaction state received from the query.

10. A fault tolerant transaction processing system as recited in claim 9, further comprising a transaction manager process resident on one of the CPUs and in communication with the TMF.

11. A fault tolerant transaction processing system as recited in claim 9, further comprising a gateway component running on at least one of the CPUs, the gateway component for facilitating communications between the CPUs over the communications fabric.

12. A fault tolerant transaction processing system comprising:

communications means for providing interprocessor and input/output communication;

a plurality of peripheral devices connected to the communication fabric, for storing a database thereon;

a plurality of processing means, each connected to the communication fabric to communicate with the plurality of peripheral devices, the plurality of processing means including at least one resource manager means, having a globally unique identifier, for participating in a transaction, modifying the database and reporting information regarding its state in a ready signal, at least one gateway means for facilitating communications between the plurality of processing means over the communications means, a cluster service means for detecting the loss of resource manager means, creating backup resource manager means for taking over the function and operation of the lost resource manager means, including the operation of committing a transaction, and assigning to backup resource manager means the globally unique identifier of a lost resource manager means, and a transaction facility means for sending a prepare signal to any participating resource manager means to begin the process of committing the transaction, receiving a ready signal from each resource manager participating in the transaction, the ready signal being accompanied by state information regarding the state of the resource manager means, and storing the received state information, receiving notice of a loss of a resource manager means, broadcasting a commit to all processing means having participating resource manager means, sending the stored state information to a backup resource manager means, in response to a query by a backup resource manager means using the assigned globally unique identifier, the backup resource manager means determining, from the stored state information, that the lost resource manager means was a participant in the transaction, and sending information regarding the state of the transaction to a backup resource manager means, in response to a query by the backup resource manager process, the backup resource manager means taking steps to commit the transaction based on the transaction state received from the query.

\* \* \* \* \*